United States Patent [19]
Takata et al.

[11] 3,814,967
[45] June 4, 1974

[54] LUMINESCENT SCREEN FOR FLYING-SPOT CATHODE-RAY TUBE

[75] Inventors: Masanobu Takata; Kuniharu Osakabe, both of Mobara; Yoshio Murata, Chiba, all of Japan

[73] Assignee: Hitachi, Ltd., Tokyo, Japan

[22] Filed: Dec. 29, 1972

[21] Appl. No.: 319,936

[30] Foreign Application Priority Data
Dec. 29, 1971 Japan.................................. 46-3468

[52] U.S. Cl. .... 313/468, 252/301.4 F, 252/301.4 H, 252/301.4 P
[51] Int. Cl. .......................... C09k 1/54, H01j 29/20
[58] Field of Search..................... 313/92; 252/301.4

[56] References Cited
UNITED STATES PATENTS
3,715,611  2/1973  Bril et al......................... 313/92 PH Primary Examiner—John Kominski
Attorney, Agent, or Firm—Craig & Antonelli

[57] ABSTRACT

A luminescent screen of a mean film thickness of 20 to 50 $\mu$ to be provided on the inner surface of the face of a flying-spot cathode-ray tube, which is formed of a cerium-activated rare-earth silicate phosphor having a mean particle diameter of 15 $\mu$ or less prepared by calcining at least either one of yttrium oxide or gadolinium oxide, cerium oxide, silicon oxide, and 1 to 20 percent by weight of an alkali metal halide in air or under a reducing atmosphere at 900° to 1,300°C. When the luminous output from such a cathode-ray tube is utilized as an image signal after having been converted into an electric signal, it is possible to ensure a high signal-to-noise ratio between the signal and the noise from a photo-cathode in response to said luminous output incident to the photocathode.

5 Claims, 3 Drawing Figures

LUMINESCENT SCREEN FOR FLYING-SPOT CATHODE-RAY TUBE

BACKGROUND OF THE INVENTION

1. Field of the Invention

This invention relates to a luminescent screen of a flying-spot cathode-ray tube, and, more particularly, to an improvement in a luminescent screen of a flying-spot cathode-ray tube which is required to have a decay time of luminescence of $2 \times 10^{-6}$ second or less.

DESCRIPTION OF THE PRIOR ART

Various substances such as calcium magnesium silicate activated with cerium, and zinc sulfide activated with nickel and silver have conventionally been known for use in a luminescent screen of a cathode-ray tube for generating a flying-spot.

Further, Japanese Pat. Publication No. 38-18,822 has disclosed that a luminescent material suitable for flying-spot generation, having a luminescence decay time of $2 \times 10^{-6}$ second or less, may be obtained from a mixed sulfide of cadmium and at least either calcium or strontium by activating with antimony of a valency of three, the composition being characterized in that the ratio of the number of cadmium atoms to the total number of calcium and strontium atoms is from $5 \times 10^{-3}$ to $10^{-1}$, and the ratio of the number of antimony atoms to the total number of calcium, strontium and cadmium atoms is from $10^{-5}$ to $10^{-2}$; also that said luminescent material shows maximum luminous output at a luminescence wave length within the range from about 5,700 to 6,500 A so that it is suitable for the transmission of a color film image.

However, in a flying-spot scanner device, there is ordinarily used a photoelectric converter tube such as a photoelectric tube or a secondary electron multiplier to convert a luminance signal from a cathode-ray tube, which has passed through a film, into an electric signal. Regarding photoemission from a photocathode in such a photoelectric converter tube, the relationship between the critical wavelength $\lambda_o$ of an incident ray and work function $\phi$ (V) of a photocathode-forming substance is expressed by the following equation (called Einstein's formula):

$$\lambda_o = 12395/\phi \text{ (A)}$$

Accordingly, the work function of a photocathode substance must be within the range from 1.63 to 3.10 V for an incident ray of a wavelength of 4,000 to 7,600 A in visible region. Since the light quantum energy of an incident ray is represented by $h\nu$ ($h$ is the Planck's constant and $\nu$ is frequency of the incident ray), energy of a light ray becomes larger and a photoelectric current also becomes larger as the wave length of the ray becomes shorter.

For the said reason, alkali metals and composite materials derived therefrom have been widely used for the photocathode substance. The critical wavelength (A) of alkali metals is calculated from the work function (V) of alkali metals, as shown in the following table.

| Metal | Li | Na | K | Rb | Cs |
|---|---|---|---|---|---|
| Work function (V) | 2.39 | 2.27 | 2.15 | 2.13 | 1.89 |
| Critical wave length (A) | 5186 | 5460 | 5765 | 5819 | 6558 |

Thus, in the case of photoelectric converter tubes currently in practical use, an incident ray of shorter wavelength is preferred even within the visible region because of better photoelectric conversion efficiency. Consequently, the luminescent substance according to the aforesaid Japanese Pat. Publication No. 38-18,822 has a disadvantage of reducing the photoelectric conversion efficiency when used with a common photoelectric converter tube.

On the other hand, in the case of conventional cerium-activated calcium magnesium silicate phosphors, the wave lengths of light emitted are in the desirable ultraviolet zone as shown in FIG. 2 by the luminance characteristic curve $A_1$ which represents the relationship between luminance (a relative value when the value at the wavelength where luminance attains a maximum is taken as 100) and wavelength (A), whereas said phosphors have a disadvantage of repid deterioration in luminance with time as shown in FIG. 3 by the luminance deterioration characteristic curve $A_2$ which represents relationship between luminous output (a relative value when the initial luminous output is taken as 100) and time. The said phosphors have another defect of low luminesence efficiency.

Furthermore, when a cathode-ray tube utilizing the above-said luminescent material with a tendency to deteriorate rapidly in luminance is brought into use, it becomes necessary for maintaining a constant emitted light output inspite of luminance deterioration, to adopt such a troublesome and hence disadvantageout operation as to convert the change in emitted light output into a change in electric signal by use of a photoconductive element, e.g., cadmium sulfide, thereby to modify the flow rate of the excited electron beam in said cathode-ray tube in accordance with said electric signal. Such an operation has a disadvantage in that when the excited electron beam is progressively intensified as the luminance of a luminescent material declines, the luminous output life of the luminescent material becomes still shorter.

SUMMARY OF THE INVENTION

The main object of this invention is to provide a luminescent substance having a luminescence decay time of $2 \times 10^{-6}$ second or less and a luminous output which little deteriorates with time, which can eliminate the aforesaid disadvantages of the conventional luminescent materials.

Another object of this invention is to provide a luminescent screen for a cathode-ray tube, which is capable of producing a flying-spot of excellent luminance and good resolution.

A further object of this invention is to provide a cathode-ray tube provided with a luminescent screen formed of a luminescent substance having an improved luminescence efficiency as compared with a conventional luminescent material.

Other objects, features and advantages of this invention will become apparent from the illustration when taken in conjunction with the accompanying drawings.

DESCRIPTION OF THE PREFERRED EMBODIMENT

Figure 1:
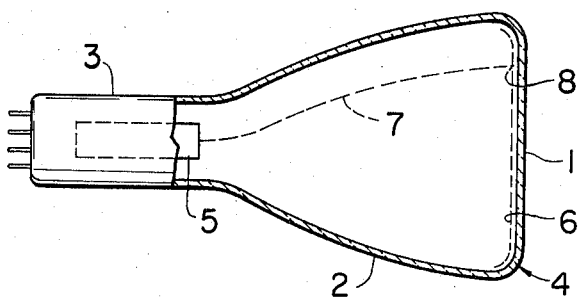
FIG. 1 is a schematic sectional view of an example of flying-spot cathode-ray tube, to which the luminescent screen of this invention is applicable.

One of the cathode-ray tubes that require a luminescent screen having an extremely short luminescence decay time or after glow time is a fying-spot cathode-ray tube (hereinafter referred to simply as a cathode-ray tube) which is used in a device for transmitting information carried on a film, etc., by flying-spot scanning, i.e., a so-called flying-spot scanner device. FIG. 1 is a schematic cross-sectional view to illustrate an example of such cathode-ray tubes, which is provided with an envelope 4 composed of a face 1, a funnel 2 and a neck 3, and an electron gun 5 arranged inside the neck 3. A luminescent screen 6 is formed on the inner surface of the face 1. Reference 7 is an electron beam emitted from the electron gun 5 and focussed into an extremely thin spot. The electron beam is allowed to scan over the luminescent screen and produces on the screen a bright spot moving at a high speed, that is, a flying-spot 8, which is used to transmit information carried on a film after conversion into an electric signal by means of a photoelectric converter tube, etc. Accordingly, the luminescent screen 6 of such a cathode-ray tube is required not only to be of an extremely uniform and efficient luminance property all over the surface, but also to have such a persistence characteristic that the luminance decay time, that is, the time elapsed for the luminescence to decay to a tenth of the initial value after discontinuance of excitation (stimulation) with an electron beam, is $2 \times 10^{-6}$ second or less.

The cathode-ray tube of this invention is characterized by being provided on the inner surface of its face with a luminescent screen of 20 to 50 $\mu$ in mean film thickness formed of a cerium-activated rare-earth silicate phosphor having a mean particle diameter of 15 $\mu$ or less, which has been prepared by calcining a mixture of either one or both of yttrium oxide and gadolinium oxide, cerium oxide, silicon oxide, and 1 to 20 % by weight of an alkali metal halide.

The substance used in this invention is fabricated as illustrated below in detail with reference to examples.

EXAMPLE 1

A thoroughly blended mixture comprising 10 g of highly pure yttrium oxide, 0.15 g of cerium oxide, 2.7 g of silicon oxide and 1.3 g of sodium chloride was charged in an alumina crucible, calcined in the air at about 1,200°C, for about 3 hours, cooled to room temperature, and then freed from water-soluble matters by washing with purified water to obtain a cerium-activated yttrium silicate phosphor.

EXAMPLE 2

A thoroughly blended mixture comprising 10 g of high-purity yttrium oxide, 0.15 g of cerium oxide, 5.7 g of slicon oxide, and 0.8 g of lithium chloride was charged in an alumina crucible, then calcined in the air at a temperature of about 1,100°C. for about 3 hours, cooled to room temperature, and thereafter freed from water-soluble constituents by washing wth purified water to obtain a cerium-activated yttrium silicate phosphor.

EXAMPLE 3

A thoroughly blended mixture of 10 g of highly pure yttrium oxalate, 0.1 of cerium oxalate, 3.8 g of silicon oxide, and 0.5 g of potassium chloride was charged in an alumina crucible, then calcined in the air at a temperature of about 1,200°C. for about 4 hours, then cooled to room temperature, and thereafter freed from water-soluble constituents by washing with purified water to obtain a cerium-activated yttrium silicate phosphor.

EXAMPLE 4

A thoroughly blended mixture of 7 g of high-purity yttrium oxide, 3 g of gadolinium oxide, 0.1 g of cerium oxide, 5.7 g of silicon oxide, and 0.8 g of lithium chloride was charged in an alumina crucible, then calcined in the air at a temperature of about 1,050°C. for about 4 hours, cooled to room temperature, and thereafter freed from water-soluble matters by washing with purified water to obtain a cerium-activated rare-earth silicate phosphor.

Figure 2:
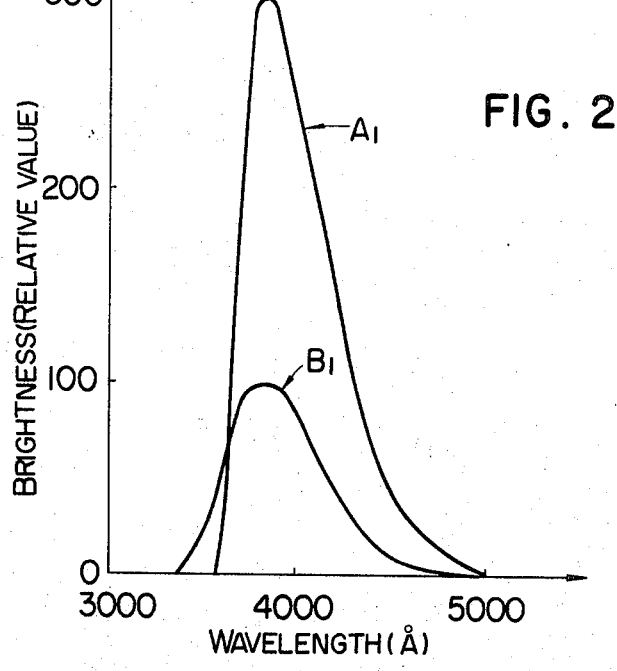
FIGS. 2 and 3 are graphs showing comparison of the luminescent substance to be used in the present luminescent screen for flying-spot cathode-ray tube with a conventional luminescent substance, FIG. 2 showing relationship between luminance and wavelength and FIG. 3 showing relationship between luminous output and time.

The above-mentioned luminescent substance for use in the present luminescent screen for a cathode-ray tube has a luminescence characteristic as represented by the curve $A_1$ in FIG. 2. As is seen from the curve, the luminescence wavelength is within the range of about 3,600 A to 5,000 A, which is far more desirable in view of photoelectric conversion efficiency of a photoelectric converter tube as compared with a luminescent substance according to Japanese Pat. Publication No. 38-18,822. As far the maximum luminance, the luminescent substance of this invention shows, as is seen in FIG. 2, far superior value as much as about three times that of conventional cerium-activated calcium magnesium silicate phosphor, the maximum value of which is shown in the curve $B_1$ and FIG. 2.

Figure 3:
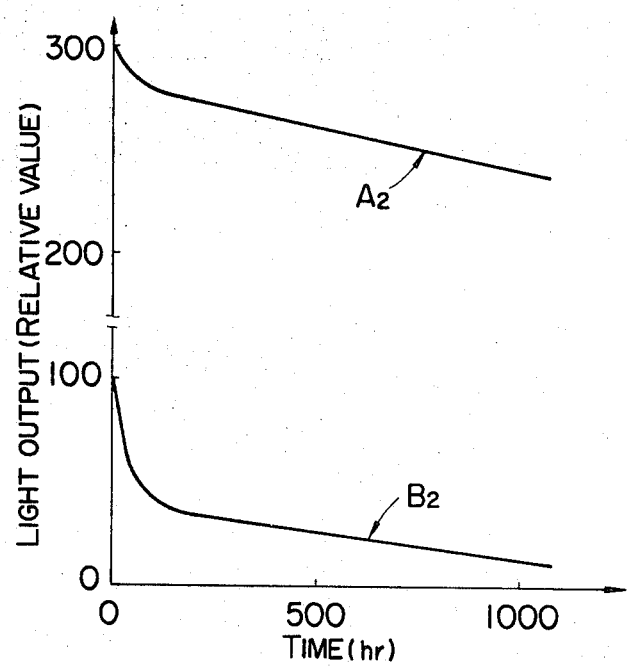

The deterioration characteristic of luminous output of the present luminescent substance is as shown by the cruve $A_2$ in FIG. 3, which indicates far smaller deterioration as compared with the curve $B_2$ that represents the deterioration characteristic of a conventional cerium-activated calcium magnesium silicate. Moreover, the initial luminous output of the present luminescent substance is as much as nearly three times that of a conventional one. Such reduced deterioration in luminous output can dispense with such a troublesome compensation procedure as is necessary in the case of a conventional cerium-activated calcium magnesium silicate phosphor in order to maintain a constant luminous output which otherwise decreases rapidly, and results in simplification as well as increased reliability of the apparatus and other valuable effects.

The cathode-ray tube of this invention has on the inner surface of its face a luminescent screen, 20 to 50 $\mu$ in mean film thickness, formed of the above-mentioned luminescent substance having excellent performance, which has been prepared in the form of fine particles of 20 to 50 $\mu$ in means diameter. Formation of such a luminescent screen can be done by a settling method or other methods. The reduction of mean particle diameter of the luminescent substance to 15 $\mu$ or less, the regulation of film thickness of the luminescent substance forming the luminescent screen within the range of 20 to 50 $\mu$, and the excellent luminance characteristic of the luminescent substance all contribute synergetically to fine-grained, uniform luminescence of excellent luminance, which permits a flying-spot scanning capable of transmitting image information carried on a film, etc., with good resolution and without local unevenness. The mean particle diameter is reduced to 15 $\mu$ or less because if it exceeds 15 $\mu$ it becomes difficult to obtain a flying-spot with good resolution owing to so-called coarse-grained luminescence. Therefore, a more desirable mean particle diameter is 10 $\mu$ or less. The mean film thickness of the luminescent substance forming the luminescent screen is regulated within the range of 20 to 50 $\mu$, because if the mean thickness is below 20 $\mu$ the luminance becomes decreased owing to insufficient thickness of the luminescent layer for desirable luminance, while if the film thickness exceeds 50 $\mu$ the available luminance becomes insufficient owing to attenuation in a thick layer of the luminescent substance, through which the surface luminescence excited by an electron beam passes and is emitted from the face. Therefore, the mean film thickness is more desirably within the range of 30 to 35 $\mu$.

In the cathode-ray tube of this invention, a desirable material of the face is that which has good ultraviolet transmittance and is little discolored by luminescence of the luminescent substance. It is of course desirable that the face is formed so as to have a good surface as far as possible and to be in uniform thickness in order that the flying-spot may pass through without being scattered.

The cathode-ray tube of this invention has an excellent luminescent screen which is composed of an excellent luminescent substance having a luminous efficiency as high as about three times that of a conventional cerium activated calcium magnesium silicate phosphor, as shown in FIGS. 2 and 3, and, moreover, is formed to have such a structure, i.e., grain size and thickness, that is suitable for a luminescent substance to manifest its luminous performance to the full extent. In the case where the luminous output from a cathode-ray tube is converted into an electric signal and utilized as an video signal, it is to be considered that noise from a photocathode deteriorates the quality of the image display. In this case, the relationship between the noise from a photocathode and the quantity of incident light may be expressed as follows:

Signal/Noise = Const. $x$ $\sqrt{\text{Quantity of incident light}}$

Therefore, an increase in the quantity of incident light results in increase of the signal-to-noise ratio and hence in improvement of the quality of video display. In this respect, use of the present cathode-ray tube may afford a beneficial effect in obtaining a high-quality video display with far less noise as compared with the case where a conventional tube is used, because the aforesaid quantity of incident light can be increased owing to a far higher luminous efficiency of the present cathode-ray tube.

We claim:

1. A luminescent screen of 20 to 50 $\mu$ in mean film thickness composed of a cerium-activated rare-earth silicate phosphor having a mean particle diameter of 15 $\mu$ or less, which has been prepared by calcining either one or both of yttrium oxide and gadolinium oxide, cerium oxide, silicon oxide, and 1 to 20 percent by weight of an alkali metal halide in the air or under a reducing atmosphere at 900° to 1,300°C.

2. A luminescent screen according to claim 1, wherein the mean particle diameter of the phosphor is 10 $\mu$ or less.

3. A luminescent screen according to claim 1, wherein the mean film thickness of the phosphor is 30 to 35 $\mu$.

4. In a flying-spot cathode-ray tube having at least an electron gun and an envelope composed of a face, a funnel and a neck, the improvement in which there has on the inner surface of the face a luminescent screen of 20 to 50 $\mu$ in mean film thickness composed of a cerium-activated rare-earth silicate phosphor having a mean particle diameter of 15 $\mu$ or less, which has been prepared by calcining either one or both of yttrium oxide and gadolinium oxide, cerium oxide, silicon oxide, and 1 to 20 percent by weight of an alkali metal halide.

5. The improvement according to claim 4, wherein the mean film thickness of the phosphor of the screen is 30 to 35 $\mu$.

* * * * *